April 7, 1970            H. DAHMS            3,505,196
REFERENCE ELECTRODE
Filed July 15, 1966
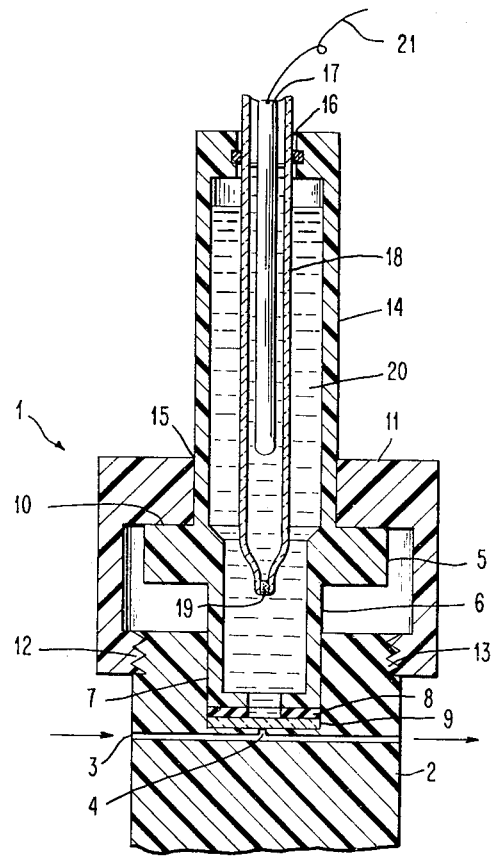
INVENTOR
HARALD DAHMS
BY *Thomas J. Kilgannon Jr.*
ATTORNEY

United States Patent Office 3,505,196
Patented Apr. 7, 1970

3,505,196
REFERENCE ELECTRODE
Harald Dahms, Ossining, N.Y., assignor to International Business Machines Corporation, Armonk, N.Y., a corporation of New York
Filed July 15, 1966, Ser. No. 565,659
Int. Cl. G01n 27/30
U.S. Cl. 204—195      1 Claim

ABSTRACT OF THE DISCLOSURE

A reference standard electrode for use in potentiometric measurements is disclosed which includes a flow channel containing a test solution and a container having electrolyte therein disposed adjacent a flow channel and communicating with it via an aperture. A membrane disposed in the aperture which provides a sharp boundary between the electrolyte and the test solution is also disclosed. A calomel or silver chloride electrode immersed within a container of electrolyte is disposed within the first mentioned container of electrolyte and a wick or the like is utilized to provide an electrically conductive path between the electrolytes.

---

The function of a reference electrode is to provide a stable and accurate voltage against which the output of an ion sensitive or other electrode may be measured. Commercially available electrodes proved relatively stable and accurate measurements which are quite useful because the rate of measurement taking is relatively slow and the reference electrode has sufficient time to dissipate the solution into which it is dipped in its electrolyte before it is again dipped into a new test solution. It has been found, however, where the rate of measurements are high such as required in automatic systems disclsed in a co-pending application entitled "Method and Apparatus for Automatic Electrochemical Analysis" filed of even date with the present application in the name of H. Dahms and assigned to the same assignee as the present invention, that the ordinary reference electrode exhibits "hysteresis." Hysteresis may be characterized as an effect which causes instability and inaccuracy in a reference electrode because the wick normally utilized in commercial electrodes does not have time to clear itself of the solution into which it was dipped before the next measurement must be made. In other words, the characteristics of the conductive path formed by the ion containing solution, the saturated wick, the electrolyte of the reference standard, and the calomel electrode are changed from measurement to measurement by the fact that traces of the unknown solution are retained in the wick.

Commercially available electrodes get around this problem by using special geometric and hydrostatic pressure arrangemetns to insure against changes due to hysteresis. Special conditions of temperature and coefficients of expansion are required, however, to provide good stability and accuracy with such electrodes. Because of the physical characteristics of such electrodes, they are subject to clogging due to precipitation of KCl, when a temperature gradient is not maintained between the electrolyte and the sample being measured.

Since all ion concentration measurements are measured against a reference standard, it is clear that the accuracy of the over-all measurements stands or falls on the accuracy and stability of the reference electrodes.

It is, therefore, an object of this invention to provide a reference standard electrode which is highly accurate and stable even when high measurement rates are required.

Another object is to provide a reference standard electrode which is not subject to hysteresis.

Another object is to provide a reference standard electrode which provides a sharp, well defined boundary between the solution being measured and the electrolyte of the reference electrode.

Still another object is to provide a reference standard electrode which provides reproducible standard voltages regardless of solution changes.

Still another object is to provide a reference standard electrode which has regular geometry and does not impede the flow of fluid in the region of the electrode.

Still another object is to provide a reference standard electrode which is useful in not only the measurement of dissolved gases and ions but also in the maasurement of macromolecular elements such as protein.

Still another object is to provide a reference standard electrode which is of rugged yet simple construction, is amenable to use with extremely small test samples and is not subject to clotting particularly when ion or dissolved gas concentration measurements on blood are being made.

In accordance with this invention a reference standard is provided which consists of a calomel or silver chloride electrode placed in a solution of KCl. The KCl solution is disposed in a container which has an opening at the bottom thereof. The opening may be a tiny unfilled aperture or may consist of a tiny hole containing a wick both of which act to provide a conductive path between the calomel or silver chloride electrode and the fluid being measured. The structure described up to this point has been essentially that which is disclosed in the prior art. In accordance with the present invention, the prior art structure is introduced into another container containing a saturated KCl solution similar to that surrounding the calomel electrode. This latter container also contains an aperture at the bottom thereof approximately 1 mm. in diameter. Across this aperture, a membrane preferably of cellophane is stretched which, in accordance with the present invention, provides a sharp, well defined boundary between the saturated KCl solution and the fluid being measured. The fluid or test sample being measured may be held in any container and the electrode dipped therein to obtain a reference voltage. However, in a preferred arrangement, where full advantage can be taken of the geometry of the reference electrode of this invention, the fluid being measured is held in a capillary tube or flow channel which is integral with the remainder of the reference electrode. An extremely short channel in registry with the hole in the container provides a path for the fluid being tested to form an interface with the cellophane membrane and thereby with the saturated KCl solution. The cellophane membrane is particularly suitable in that it is permeable to most ions and has a smooth, flat geometry which does not interfere with the flow of fluid being measured.

The foregoing and other objects, features and advantages of the present invention will be more apparent from the following more particular description of a preferred embodiment of the invention as illustrated in the accompanying drawing.

The sole drawing shows a cross-sectional view of a substantially cylindrical reference electrode which in accordance with the teaching of the invention incorporates a membrane between the electrolyte and a fluid to be measured to prevent hysteresis.

In the drawing, reference electrode 1 is shown in cross-section. Electrode 1 consists of a lower portion or section 2 which contains a flow channel or capillary 3 which is machined in portion 2. An aperture 4, approximately one millimeter in diameter intersects channel 3 and interconnects hollow electrode housing or section 5 with flow channel 3. Housing 5 has a hollow apertured male portion 6 which is receivable in female receptacle portion 7 disposed in the upper portion of lower section 2. Interposed between the bottom of male portion 6 and the bottom of female portion 7 are an apertured gasket 8, preferably made of rubber and a permeable membrane 9. Membrane 9 will be discussed in detail hereinbelow in conjunction with the description of its function.

In the drawing, shoulder 10 extends from housing 5 and is designed to engage cap 11. Threaded portion 12 on cap 11 is designed to mate with threaded portion 13 on the upper portion of section 2. In this manner, gasket 8 and membrane 9 are fixedly held across aperture 4 by male portion 6 when cap 11 is screwed to the upper portion of section 2. Vertical hollow portion 14 extends upwardly from shoulder 10 through an opening 15 in cap 11 and contains an aperture 16 through which a commerical type standard electrode 17 and electrolyte container 18 extend. Container 18 has a wick 19 at the bottom thereof to provide a conductive path between electrolyte container 18 and an electrolyte 20 which fills hollow housing 5. Conductor 21 is connected to electrode 17 and connects directly to measuring instrument such as a pH meter (not shown).

In operation, flow channel 3 is filled with a solution which is undergoing potentiometric measurements for ion, dissolved gas or other material concentrations. Membrane 9 which is permeable to most ions and dissolved gases forms a sharp, well defined boundary between the solution or fluid in channel 3 and the electrolyte contained in hollow housing 5. Membrane 9 is preferably made of wide pore cellophane where ions and dissolved gases are being measured. Membrane 9 in the embodiment shown in the drawing has a thickness of approximately one-half mil. The minimum thickness obtainable is limited only by the mechanical strength of the membrane. The thinner the membrane, the better the results.

Since the cellophane membrane 9 is permeable to ions and dissolved gases, a conductive path is provided between fluid in channel 3, the electrolyte 20 in housing 5, wick 19 and electrode 17.

At this point, it should be noted that flow channel 3 and lower portion 2 could be removed from electrode 1 leaving the remainder of the structure as described. By this means, reference electrode 1 can be converted to a dip-type electrode. In other words, the necessity for flowing the solution through channel 3 is eliminated and the remainder of electrode 1 may be manually dipped into a solution. The removal of channel 3 in no way effects the improvement in results obtained by virtue of the presence of membrane 9.

By providing a membrane of the nature of membrane 9', "hysteresis" effects are eliminated and stable and accurate measurements using a relatively simple structure are provided. "Hysteresis" may be characterized as an effect which causes instability and inaccuracy in a reference electrode because the wick normally utilized in commercially available reference electrodes does not have time to clear itself completely of the solution into which it was dipped before the next measurement is made. By providing a sharp, well defined boundary between the test sample and the electrolyte, the ions from one measurement can be dissipated in the electrolyte before the time of the next measurement arrives.

In this manner, the characteristics of the conductive path from the test sample through the membrane and electrolyte to the wick, electrolyte and standard electrode are maintained substantially the same because the amount of fluid from channel 3 entering the electrolyte is negligible in comparison to the volume of electrolyte in hollow housing 5. The use of the cellophane membrane as the interface between the flow channel and the reference electrode structure also permits substantially smooth flow in the channel and clotting tendencies in blood due to wicks and the like in flow channels are substantially eliminated. Where one wishes to measure macromolecules such as protein molecules along with ions or dissolved gases, the cellophane membrane described hereinabove could, in the ion, dissolved gas, macromolecule environment, only be characterized as semi-permeable. Where membranes are semi-permeable (the pores of the membrane are too small to pass molecules above a certain size) unwanted voltage due to charge separation arise. To eliminate charge separation, a suitable membrane having pores of sufficient size to pass the macromolecules must be provided. One suitable membrane is a Teflon membrane containing a plurality of capillary sized holes therein. The Teflon membrane may be substituted for the cellophane membrane 9 of the drawing and similar results will be attained.

In connection with membrane 9 made of cellophane, test results have indicated that voltage readings using electrode 1 are reproducible to less than 0.1 mv. after solution changes. Voltages under flow conditions changed by ±0.5 mv. during pumping of solution through channel 3. When the solution was kept stagnant, the voltage remained stable.

While the invention has been particularly shown and described with reference to a preferred embodiment thereof, it will be understood by those skilled in the art that various changes in form and details may be made therein without departing from the spirit of the invention.

What is claimed is:
1. A reference standard configuration for use in potentiometric measurements comprising in combination:
a first container of given width having a given longitudinal axis and having electrolyte disposed therein,
a second container of electrolyte disposed coaxially with said first container and immersed in the electrolyte thereof,
an electrode disposed coaxially with said second container and immersed in the electrolyte thereof,
a capillary flow channel containing a test solution intersecting said axis,
a connecting aperture of substantially the same cross sectional dimension as said capillary flow channel disposed coaxially of said axis connecting said flow channel and said first container,
a membrane permeable to said test solution interposed between said aperture and said first container and having an interface with said test solution of the same area as said aperture area to provide a sharp boundary between said electrolyte and said test solution and,
a wick permeable to said electrolyte interconnecting said first and said second containers.

References Cited
UNITED STATES PATENTS

| | | | |
|---|---|---|---|
| 1,779,232 | 10/1930 | Handforth | 204—195 |
| 2,400,091 | 5/1946 | Alfthan | 136—146 |
| 2,760,922 | 8/1956 | Williams | 204—195 |
| 3,065,151 | 11/1962 | Schaschl et al. | 204—195 |
| 3,103,480 | 9/1963 | Watanabe et al. | 204—195 |
| 3,281,348 | 10/1966 | Schumacher et al. | 204—195 |
| 3,290,584 | 12/1966 | Harms et al. | 204—195 |

OTHER REFERENCES

Mantell: "Electrochemical Engineering," 4th ed., McGraw-Hill Co., N.Y., 1960, pp. 627–628.

Ives et al. "Reference Electrodes," Academic Press, N.Y., 1961, pp. 582–583.

T. TUNG, Primary Examiner